US011030564B2

(12) United States Patent
Fuke et al.

(10) Patent No.: US 11,030,564 B2
(45) Date of Patent: Jun. 8, 2021

(54) MOTION ANALYSIS APPARATUS, MOTION ANALYSIS METHOD, AND COMPUTER PROGRAM PRODUCT

(71) Applicant: Kabushiki Kaisha Toshiba, Tokyo (JP)

(72) Inventors: Sawa Fuke, Kawasaki (JP); Kazunori Imoto, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 786 days.

(21) Appl. No.: 15/659,948

(22) Filed: Jul. 26, 2017

(65) Prior Publication Data

US 2018/0189700 A1 Jul. 5, 2018

(30) Foreign Application Priority Data

Jan. 5, 2017 (JP) ............................ JP2017-000316

(51) Int. Cl.
*G06Q 10/06* (2012.01)
*G06N 20/00* (2019.01)

(52) U.S. Cl.
CPC ......... *G06Q 10/0639* (2013.01); *G06N 20/00* (2019.01)

(58) Field of Classification Search
CPC .................................................. G06Q 10/0639
See application file for complete search history.

(56) References Cited

U.S. PATENT DOCUMENTS 8,909,497 B1 * 12/2014 Shkolnikov ............. G01P 15/00 340/573.1
2010/0292618 A1 * 11/2010 Okuya ................ A61B 5/1038 600/595
2011/0022432 A1 * 1/2011 Ishida .................... G06Q 10/06 705/7.42

(Continued)

FOREIGN PATENT DOCUMENTS

JP 5159263 6/2009
JP 2012-93936 A 5/2012

(Continued)

OTHER PUBLICATIONS

Abe et al., "A Case Study of Sequence Pattern Mining on Medical Multiple Sequential Data," Journal of the Japanese Society for Artificial Intelligence, vol. 27, No. 2, pp. 154-161 (Mar. 2012).

*Primary Examiner* — Raymond L Nimox
(74) *Attorney, Agent, or Firm* — Finnegan, Henderson, Farabow, Garrett & Dunner, L.L.P.

(57) ABSTRACT

According to an embodiment, a motion analysis apparatus includes a memory and processing circuitry. The processing circuitry detects a corresponding segment using first time-series data based on output of a first sensor configured to measure movement of a first object and second time-series data based on output of a second sensor configured to measure movement of a second object, the corresponding segment being a segment in which the first time-series data and the second time-series data are similar in their waveform patterns or co-occur. The processing circuitry associates (Continued)

100
20
10 information specifying the detected corresponding segment with at least one of information specifying the first object or information specifying the second object.

6 Claims, 18 Drawing Sheets

(56) References Cited

U.S. PATENT DOCUMENTS

| | | | | |
|---|---|---|---|---|
| 2012/0117087 | A1 | 5/2012 | Imoto et al. | |
| 2013/0304685 | A1 * | 11/2013 | Kurata | G01C 21/20<br>706/45 |
| 2014/0288874 | A1 * | 9/2014 | Matsunaga | A61B 5/1126<br>702/141 |
| 2016/0070958 | A1 * | 3/2016 | Whelan | A61B 5/7275<br>382/107 |
| 2016/0148103 | A1 * | 5/2016 | Sarrafzadeh | G06K 9/00348<br>706/46 |
| 2017/0182413 | A1 * | 6/2017 | Takahagi | A63F 13/212 |
| 2017/0357849 | A1 * | 12/2017 | Katsu | G06Q 30/02 |

FOREIGN PATENT DOCUMENTS

| | | | | |
|---|---|---|---|---|
| JP | 2012093936 | A * | 5/2012 | |
| JP | 2013-188858 | | 9/2013 | |
| JP | 2016-35679 | A | 3/2016 | |
| WO | WO 2010/140195 | A1 | 12/2010 | |
| WO | WO 2016/035464 | A1 | 3/2016 | |
| WO | WO-2016035464 | A1 * | 3/2016 | A63B 69/00 |

* cited by examiner (PROCESS A)

MOVEMENT OF WORKER

SEGMENT IN WHICH WORKER PERFORMS OPERATION USING TOOL

MOVEMENT OF TOOL (PROCESS B)

LEARNING DATA

CONSTRUCTION OF ESTIMATOR

TEACHER LABEL (TOOL)

(PROCESS C)

MOVEMENT OF WORKER

ESTIMATE MOTION

TOOL

10
FIRST SENSOR UNIT
20
SECOND SENSOR UNIT
100
MOTION ANALYSIS APPARATUS
110
ACQUISITION UNIT
120
FIRST PROCESSING UNIT
121
SYNCHRONIZING UNIT
122
DETECTING UNIT
123
ASSOCIATING UNIT
170
TIME-SERIES DATA
180
OBJECT ASSOCIATION INFORMATION
130
SECOND PROCESSING UNIT
131
GENERATING UNIT
132
CONSTRUCTING UNIT
190
ESTIMATOR
140
THIRD PROCESSING UNIT
141
ESTIMATING UNIT
150
OUTPUT UNIT

X1
AMPLITUDE
TIME [msec]

X2
33
AMPLITUDE
TIME [msec]

CORRELATION COEFFICIENT ρ (t)
TIME [msec]

180

| WORKER ID | TOOL ID | START TIME [msec] | END TIME [msec] |
|---|---|---|---|
| 10010 | ELECTRIC SCREWDRIVER | 1100 | 6220 |
| 10010 | TESTER | 7833 | 9200 |
| 10010 | ELECTRIC SCREWDRIVER | 10360 | 14420 |
| 10010 | PART A | 16742 | 20100 |
| ⋮ | ⋮ | ⋮ | ⋮ |

| TIME [msec] | FIRST TIME-SERIES DATA | | | TOOL ID |
|---|---|---|---|---|
| | X-AXIS ACCELERATION | Y-AXIS ACCELERATION | Z-AXIS ACCELERATION | |
| 1000 | 0.289 | -0.563 | 0.122 | NULL |
| 1025 | 0.255 | -0.451 | 0.171 | NULL |
| 1050 | 0.283 | -0.563 | 0.124 | NULL |
| 1075 | 0.235 | -0.629 | 0.452 | NULL |
| 1100 | 0.279 | -0.819 | 0.642 | ELECTRIC SCREWDRIVER |
| 1125 | 0.291 | -0.922 | 0.722 | ELECTRIC SCREWDRIVER |
| 1150 | 0.245 | -0.883 | 0.659 | ELECTRIC SCREWDRIVER |
| 1175 | 0.214 | -0.924 | 0.713 | ELECTRIC SCREWDRIVER |
| 1200 | 0.222 | -0.854 | 0.690 | ELECTRIC SCREWDRIVER |
| 1225 | 0.312 | -0.792 | 0.692 | ELECTRIC SCREWDRIVER |
| 1250 | 0.210 | -0.882 | 0.728 | ELECTRIC SCREWDRIVER |
| 1275 | 0.331 | -0.881 | 0.591 | ELECTRIC SCREWDRIVER |
| 1300 | 0.192 | -0.942 | 0.775 | ELECTRIC SCREWDRIVER |
| ⋮ | ⋮ | ⋮ | ⋮ | ⋮ |

FIRST SENSOR UNIT
10
SECOND SENSOR UNIT
20
100
MOTION ANALYSIS APPARATUS
ACQUISITION UNIT
110
FIRST PROCESSING UNIT
120
SYNCHRONIZING UNIT
121
EXTRACTING UNIT
124
DETECTING UNIT
122
ASSOCIATING UNIT
123
TIME-SERIES DATA
170
OBJECT ASSOCIATION INFORMATION
180
SECOND PROCESSING UNIT
130
GENERATING UNIT
131
CONSTRUCTING UNIT
132
ESTIMATOR
190
THIRD PROCESSING UNIT
140
ESTIMATING UNIT
141
OUTPUT UNIT
150

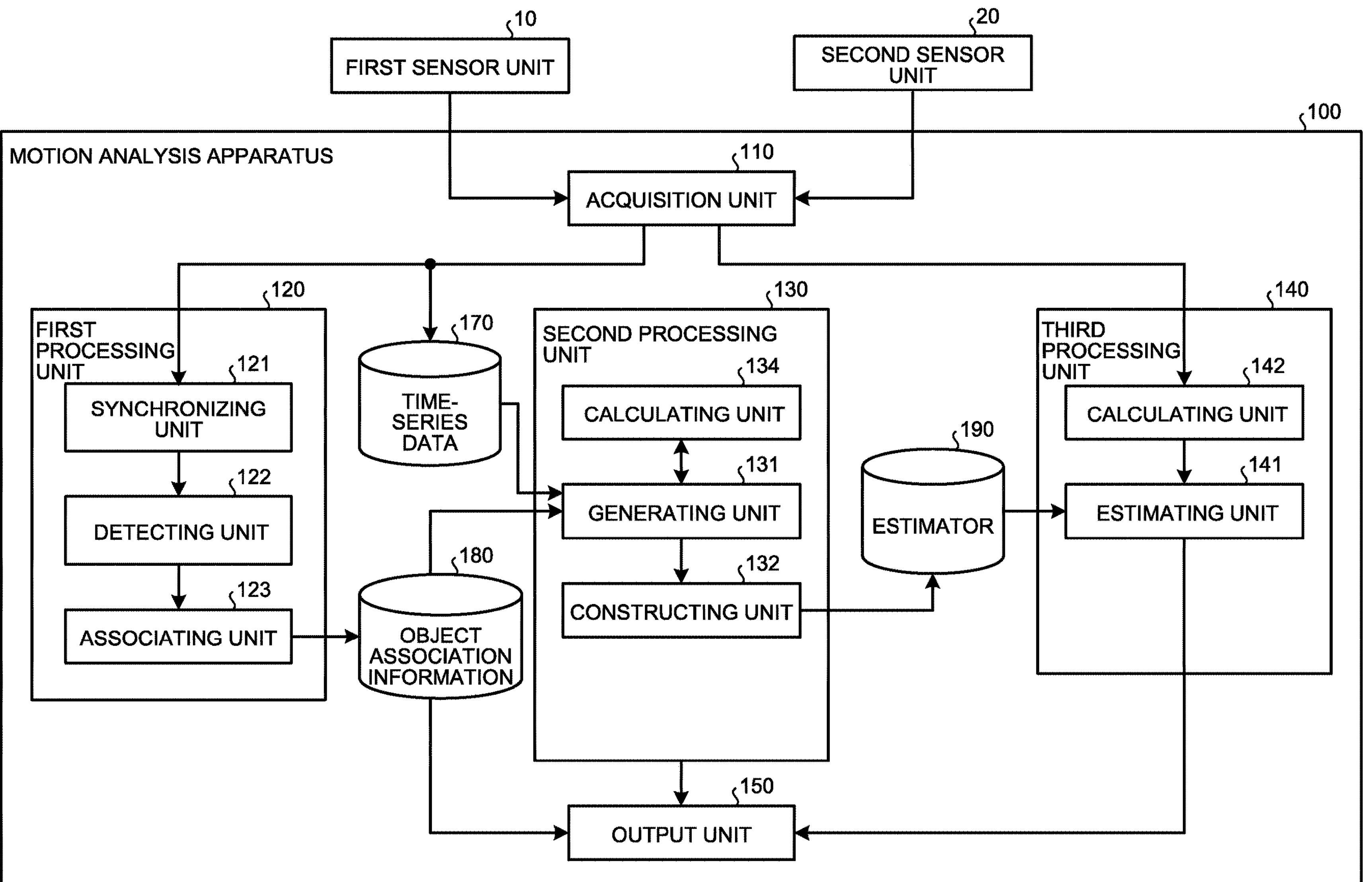
FIG.14
FIRST SENSOR UNIT
10
SECOND SENSOR UNIT
20
100
MOTION ANALYSIS APPARATUS
ACQUISITION UNIT
110
FIRST PROCESSING UNIT
120
SYNCHRONIZING UNIT
121
DETECTING UNIT
122
ASSOCIATING UNIT
123
TIME-SERIES DATA
170
OBJECT ASSOCIATION INFORMATION
180
SECOND PROCESSING UNIT
130
CALCULATING UNIT
134
GENERATING UNIT
131
CONSTRUCTING UNIT
132
ESTIMATOR
190
THIRD PROCESSING UNIT
140
CALCULATING UNIT
142
ESTIMATING UNIT
141
OUTPUT UNIT
150

180

| TOOL ID | WORKER ID | START TIME [msec] | END TIME [msec] |
|---|---|---|---|
| ELECTRIC SCREWDRIVER | 10010 | 1100 | 6220 |
| ELECTRIC SCREWDRIVER | 10011 | 7833 | 9200 |
| ELECTRIC SCREWDRIVER | 10010 | 10360 | 14420 |
| ELECTRIC SCREWDRIVER | 10011 | 16742 | 20100 |
| ⋮ | ⋮ | ⋮ | ⋮ |

| WORKER ID | TOOL ID | CLUSTER ID | START TIME [msec] | END TIME [msec] |
|---|---|---|---|---|
| 10010 | ELECTRIC SCREWDRIVER | 1 | 1100 | 6220 |
| 10010 | ELECTRIC SCREWDRIVER | 1 | 7833 | 9200 |
| 10010 | ELECTRIC SCREWDRIVER | 2 | 10360 | 14420 |
| 10010 | ELECTRIC SCREWDRIVER | 3 | 16742 | 20100 |
| ⋮ | ⋮ | ⋮ | ⋮ | ⋮ |

MOTION ANALYSIS APPARATUS, MOTION ANALYSIS METHOD, AND COMPUTER PROGRAM PRODUCT

CROSS-REFERENCE TO RELATED APPLICATIONS

This application is based upon and claims the benefit of priority from Japanese Patent Application No. 2017-000316, filed on Jan. 5, 2017; the entire contents of which are incorporated herein by reference.

FIELD

Embodiments described herein relate generally to a motion analysis apparatus, a motion analysis method, and a computer program product.

BACKGROUND

Grasping motion history of workers and analyzing their problems have been conducted to improve a variety of work and to increase production efficiency. Recent more and more miniaturized wireless sensor devices enable measurement of human movement with a simple configuration. There is an attempt to compile history by attaching sensors to workers working in the field and specifying the motion in the field based on the measurement values of the sensors.

A general method of specifying worker's motion using a sensor uses a motion dictionary that defines the relation between time-series data of sensor output and the motion estimated from this time-series data, and compares time-series data of sensor output with the motion dictionary.

Such a method takes time and effort in assigning motion labels to time-series data, which is necessary for constructing the motion dictionary. Moreover, the dictionary is required to be improved. Meanwhile, there is a demand for automatically labelling time-series data of sensor output not only for such a use as compiling worker's motion history but also for various uses of analyzing movement using a sensor.

BRIEF DESCRIPTION OF THE DRAWINGS

FIG. 14 is a block diagram illustrating a functional configuration example of the motion analysis apparatus of a second modification;

DETAILED DESCRIPTION

According to an embodiment, a motion analysis apparatus includes a memory and processing circuitry configured to detect a corresponding segment using first time-series data based on output of a first sensor configured to measure movement of a first object and second time-series data based on output of a second sensor configured to measure movement of a second object, the corresponding segment being a segment in which the first time-series data and the second time-series data are similar in their waveform patterns or cooccur; and associate information specifying the detected corresponding segment with at least one of information specifying the first object or information specifying the second object.

A motion analysis apparatus, a motion analysis method, and a computer program product of embodiments will be described in detail below with reference to the accompanying drawings. In the following description, components having the same functions will be denoted with the same reference signs and an overlapping description will be omitted as necessary.

First Embodiment

In the present embodiment, compact sensors are attached to a worker performing operation in the field and an object used by the worker, such as a tool, a part, and an operating facility in the field, to measure movement of both the worker and the object. By comparing time-series data of sensor output on the worker side with time-series data of sensor output on the object side, the segment (time segment) in which the worker performs operation using the object is detected. The time-series data representing the worker's movement in the segment is assigned a motion label for specifying the object. The labelled time-series data can be used to generate learning data for constructing an estimator for estimating motion by the worker through machine learning. Once an estimator is constructed using the learning data, it is possible to estimate the use of the object by the worker solely from time-series data based on sensor output on the worker side using this estimator.

Figure 1:
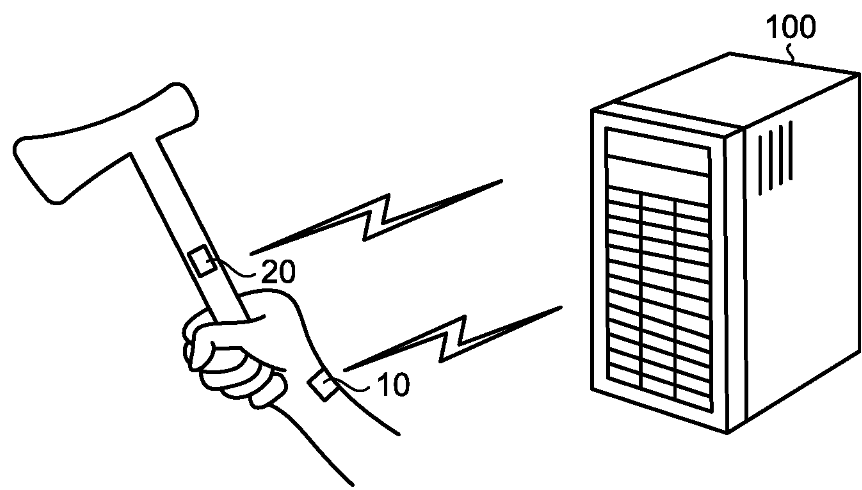
FIG. 1 is a diagram illustrating an overview of a motion analysis apparatus of a first embodiment.

FIG. 1 is a diagram illustrating an overview of a motion analysis apparatus 100 of the present embodiment. As illustrated in FIG. 1, the motion analysis apparatus 100 of the present embodiment receives time-series data corresponding to movement of a worker or movement of a tool from each of a first sensor unit 10 attached to, for example, the hand of the worker working in the field (an example of the first object) and a second sensor unit 20 attached to a tool used by the worker (an example of the second object). The first sensor unit 10 and the second sensor unit 20 are attached, for example, directly on the worker's hand or the tool using a tacky adhesive, or with a glove or a tool cover interposed. The first sensor unit 10 and the second sensor unit 20 may be attached to the worker's hand or the tool using a brace such as belt or clip.

The first sensor unit 10 and the second sensor unit 20 each include a sensor that measures movement and a transmitter that transmits the measurement value of this sensor in units of time as time-series data, and transmit the time-series data corresponding to movement of the worker or the tool to the motion analysis apparatus 100 in real time or after temporarily storing the data into an internal memory. In the present embodiment, a three-axis acceleration sensor with a sampling frequency of 30 Hz is used as the sensor that measures movement, by way of example. Alternatively, a gyro sensor or a geomagnetic sensor may be used.

Time-series data can be transmitted from the first sensor unit 10 or the second sensor unit 20 to the motion analysis apparatus 100 by any method, for example, through wired communication, long-range wireless communication, or short-range wireless communication. The time-series data transmitted from the first sensor unit 10 or the second sensor unit 20 may be stored in a cloud server or any other external storage device different from the motion analysis apparatus 100, so that the motion analysis apparatus 100 acquires the time-series data therefrom. Although FIG. 1 illustrates one first sensor unit 10 and one second sensor unit 20, in actuality, the first sensor unit 10 is attached to each of a large number of workers and the second sensor unit 20 is attached to each of a large number of objects such as tools, parts, operating facilities in the field in order to generate many pieces of learning data required for machine learning of the estimator.

Figure 2A:
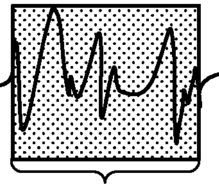
FIGS. 2A, 2B, and 2C are diagrams illustrating an overview of the process by the motion analysis apparatus of the first embodiment.
Figure 2B:
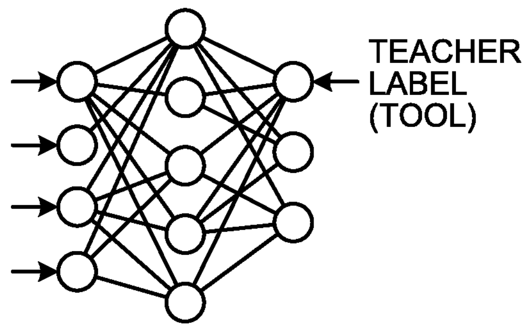
Figure 2C:
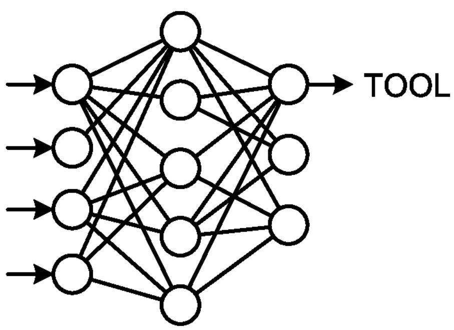

FIGS. 2A, 2B, and 2C are diagrams illustrating an overview of the process by the motion analysis apparatus 100 of the present embodiment. The processing by the motion analysis apparatus 100 of the present embodiment is mainly divided into three operations, namely, a process A illustrated in FIG. 2A, a process B illustrated in FIG. 2B, and a process C illustrated in FIG. 2C.

As illustrated in FIG. 2A, the process A is a process of detecting a segment in which a worker performs operation using a tool, using the time-series data corresponding to the worker's movement measured by the first sensor unit 10 and the time-series data corresponding to the movement of the tool measured by the second sensor unit 20. As illustrated in FIG. 2B, the process B is a process of constructing an estimator for estimating motion of the worker through machine learning using the segment that is detected by the process A in the time-series data corresponding to the movement of the worker and is given a label of the tool, as learning data. As illustrated in FIG. 2C, the process C is a process of estimating movement of the worker (the use of the tool) from the time-series data corresponding to the movement of the worker measured by the first sensor unit 10, using the estimator constructed by the process B. It is assumed that the process A and the process B are conducted when the motion analysis apparatus 100 is introduced into the field, and that the process C is conducted when motion is actually analyzed or history is recorded.

Figure 3:
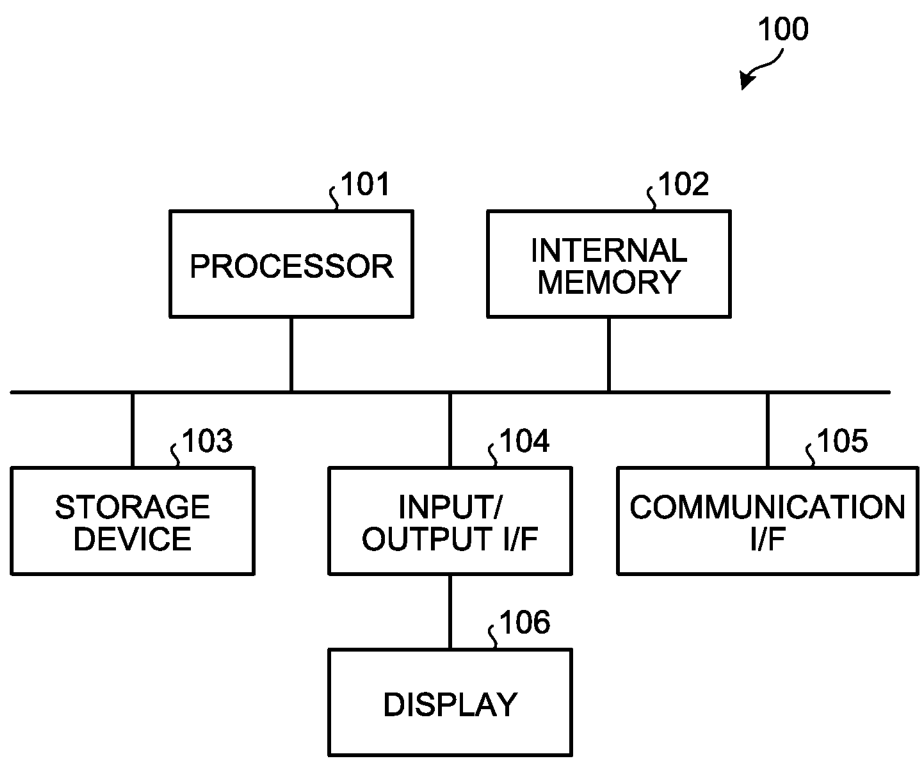
FIG. 3 is a block diagram illustrating a hardware configuration example of the motion analysis apparatus of the first embodiment.

FIG. 3 is a block diagram illustrating a hardware configuration example of the motion analysis apparatus 100 of the present embodiment. For example, as illustrated in FIG. 3, the motion analysis apparatus 100 of the present embodiment has the hardware configuration of a general computer including a processor (processing circuitry) 101 such as a central processing unit (CPU) or a graphics processing unit (GPU), an internal memory 102 such as a random access memory (RAM) or a read only memory (ROM), a storage device 103 such as a hard disk drive (HDD) or a solid state drive (SDD), an input/output interface (I/F) 104 for connecting peripheral equipment such as a display 106, and a communication I/F 105 for communicating with external equipment such as the first sensor unit 10 and the second sensor unit 20. The motion analysis apparatus 100 of the present embodiment can implement functional components described later, for example, by the processor 101 executing a computer program stored in the storage device 103, the internal memory 102, or the like using the internal memory 102.

Figure 4:
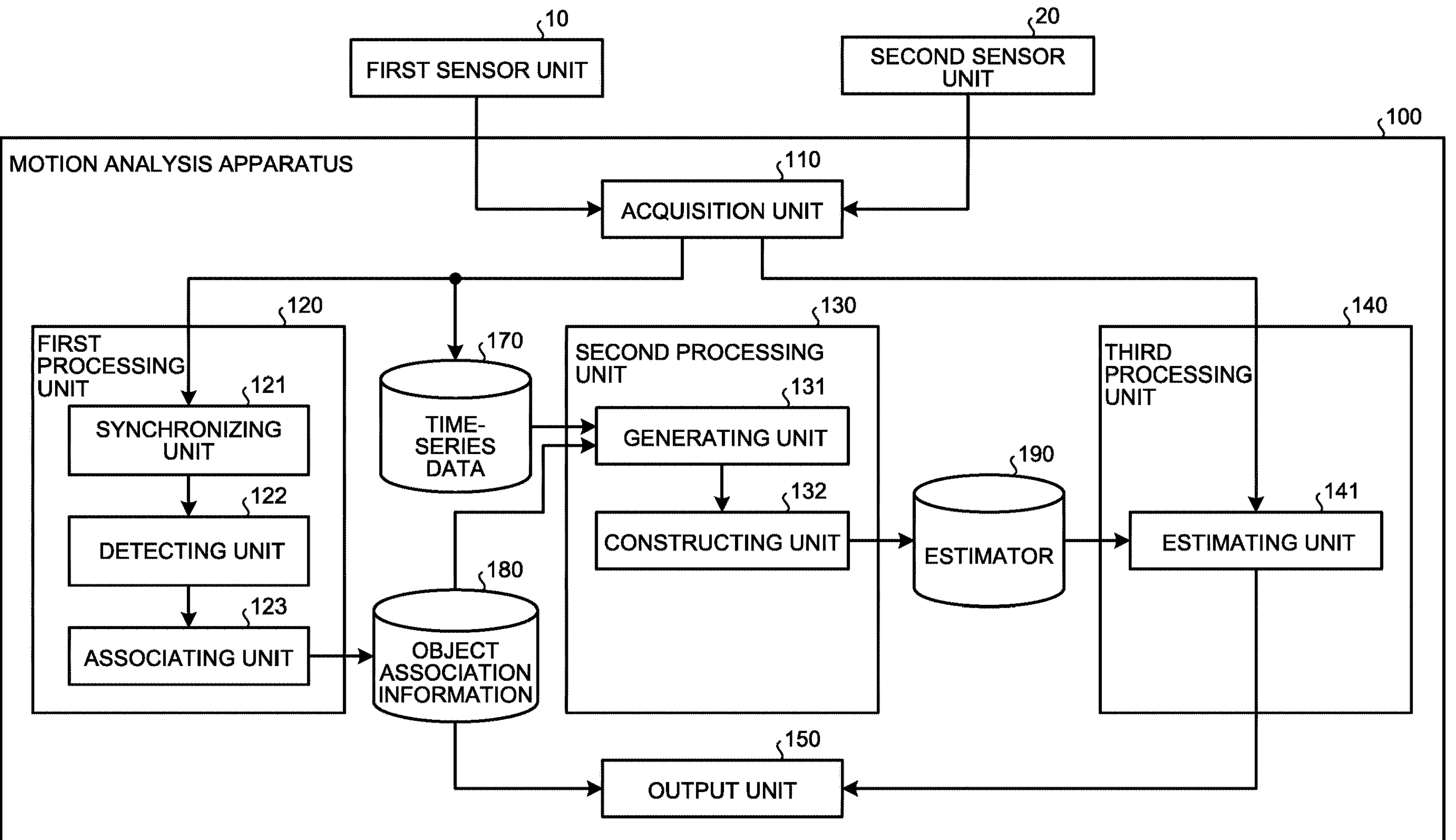
FIG. 4 is a block diagram illustrating a functional configuration example of the motion analysis apparatus of the first embodiment.

FIG. 4 is a block diagram illustrating a functional configuration example of the motion analysis apparatus 100 of the present embodiment. For example, as illustrated in FIG. 4, the motion analysis apparatus 100 of the present embodiment includes, as functional components implemented through cooperation of the hardware illustrated in FIG. 3 with software (computer program), an acquisition unit 110, a first processing unit 120, a second processing unit 130, a third processing unit 140, and an output unit 150.

The acquisition unit 110 acquires time-series data corresponding to movement of the worker measured by the first sensor unit 10 (hereinafter referred to as "first time-series data") and time-series data corresponding to movement of the tool measured by the second sensor unit 20 (hereinafter referred to as "second time-series data"). The acquisition unit 110 may directly acquire the first time-series data transmitted from the first sensor unit 10 or the second time-series data transmitted from the second sensor unit 20 or may access a cloud server or an external storage device to acquire the first time-series data or the second time-series stored in the cloud server or the external storage device as described above.

In the above-noted process A, the acquisition unit 110 acquires both of first time-series data and second time-series data, supplies the first time-series data and the second time-series data to the first processing unit 120, and stores them into the storage device 103 or the like (time-series data 170 in FIG. 4). In the above-noted process C, the acquisition unit 110 acquires first time-series data alone and supplies the acquired first time-series data to the third processing unit 140.

The first processing unit 120 is a processing unit that executes each process equivalent to the process A and includes a synchronizing unit 121, a detecting unit 122, and an associating unit 123.

The synchronizing unit 121 has the function of time-synchronizing the first time-series data with the second time-series data. As the first time-series data and the second time-series data, for example, time-series data of acceleration signals measured by a three-axis acceleration sensor is adopted, and the measurement time corresponding to each acceleration value is added to those time-series data. The measurement time may be the time linked to each acceleration value or may be represented by a combination of the measurement start time and the sampling cycle. When the system clock information held in the inside of the first sensor unit 10 is synchronized with the system clock information held in the inside of the second sensor unit 20 in advance at the start of measurement, the synchronizing unit 121 can use the measurement time of each time-series data to achieve synchronization.

In a case of the setting in which the system clock information of the first sensor unit 10 is not synchronized with the system clock information of the second sensor unit 20 at the start of measurement, both of the first sensor unit 10 and the second sensor unit 20 are vibrated characteristically within a predetermined period of time T1 (for example, 1000 msec) from the start of measurement, and the synchronizing unit 121 time-synchronizes the first time-series data with the second time-series data, using a drive waveform associated with this characteristic vibration as a clue.

Figure 5A:
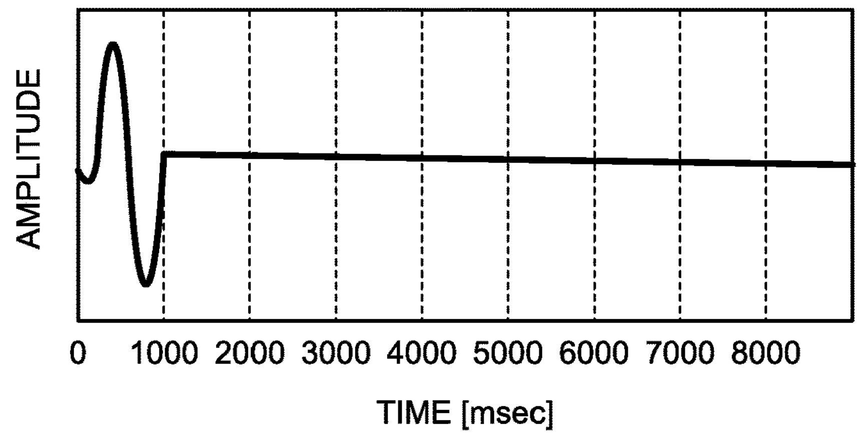
FIGS. 5A, 5B, and 5C are diagrams illustrating the process by a synchronizing unit.
Figure 5B:
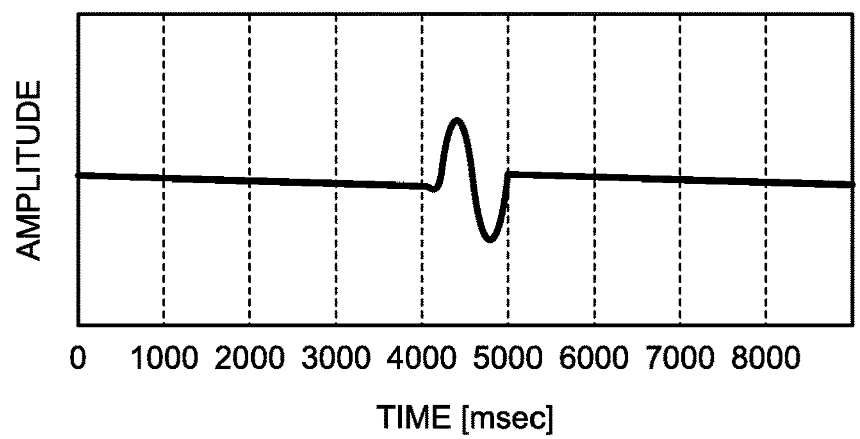
Figure 5C:
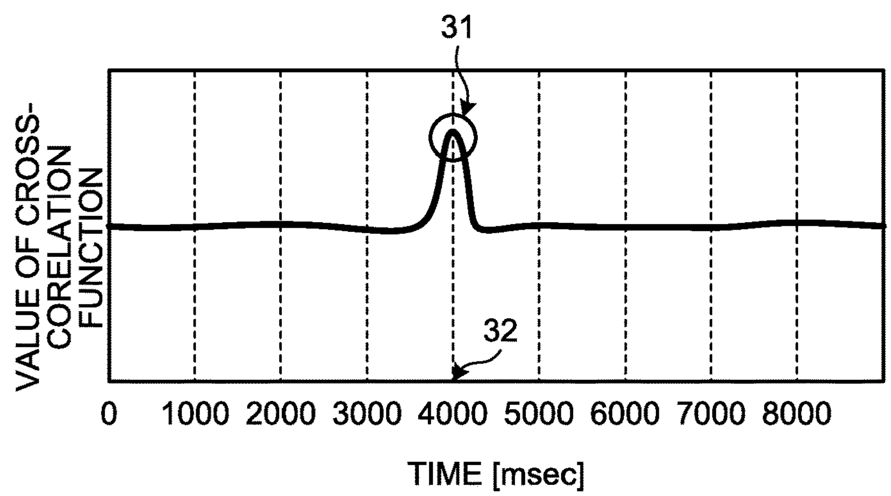

For example, when low-frequency motion like shaking a tool periodically from side to side with the tool in hand by a worker at any timing in the period of time T1 is selected as the characteristic vibration, as illustrated in FIGS. 5A, 5B, and 5C, the synchronizing unit 121 calculates a cross-correlation function (see FIG. 5C) between the acceleration signal of at least one axis measured by the first sensor unit 10 within the period of time T1 (see FIG. 5A) and the acceleration signal of at least one axis measured by the second sensor unit 20 within the period of time T1 (see FIG. 5B). Then, the time 32 of the peak 31 at which the cross-correlation function has the maximum value is calculated as a time lag between the first sensor unit 10 and the second sensor unit 20, and one of the first time-series data and the second time-series data is shifted by the amount of time corresponding to the time 32 to time-synchronize those waveform data with each other.

Alternatively, for example, when high-frequency motion like colliding a tool grabbed by a worker against another object is selected as the characteristic vibration, the synchronizing unit 121 may calculate the root mean sum square of acceleration signals of three axes measured by the first sensor unit 10 within the period of time T1 and the root mean sum square of acceleration signals of three axes measured by the second sensor unit 20 within the period of time T1 and calculate the time difference between their maximum peak values as the time lag between the first sensor unit 10 and the second sensor unit 20 to time-synchronize the first time-series data with the second time-series data.

The detecting unit 122 detects a corresponding segment in which waveform pattern of the first time-series data and the second time-series data synchronized by the synchronizing unit 121 are similar or co-occured. For example, the detecting unit 122 detects, as a corresponding segment, a segment in which a waveform representing the first time-series data (hereinafter referred to as “first waveform”) and a waveform representing the second time-series data (hereinafter referred to as “second waveform”) is same or similar (in other words, the similarity between the first waveform and the second waveform is equal to or greater than a reference value).

Figure 6A:
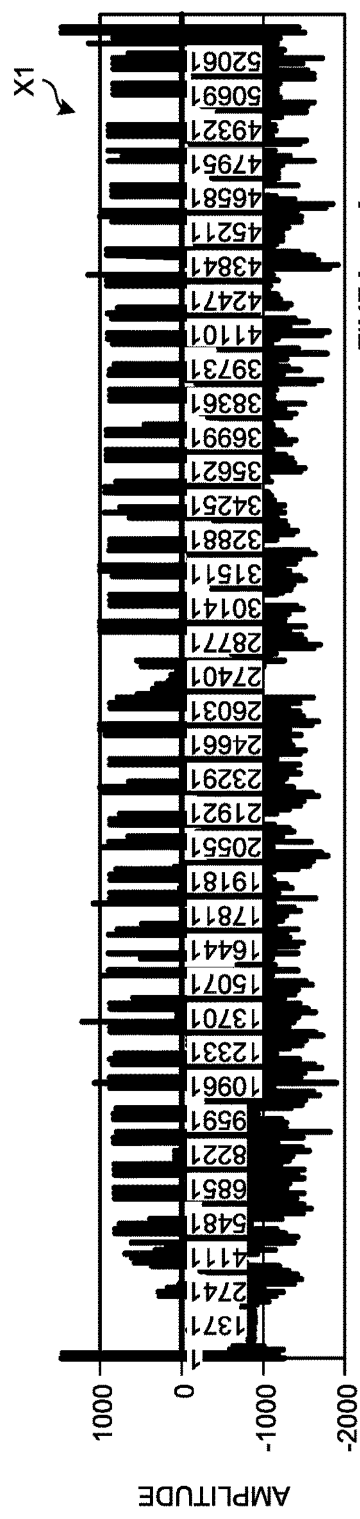
FIGS. 6A, 6B, and 6C are diagrams illustrating the correlation between human movement and movement of an object.
Figure 6B:
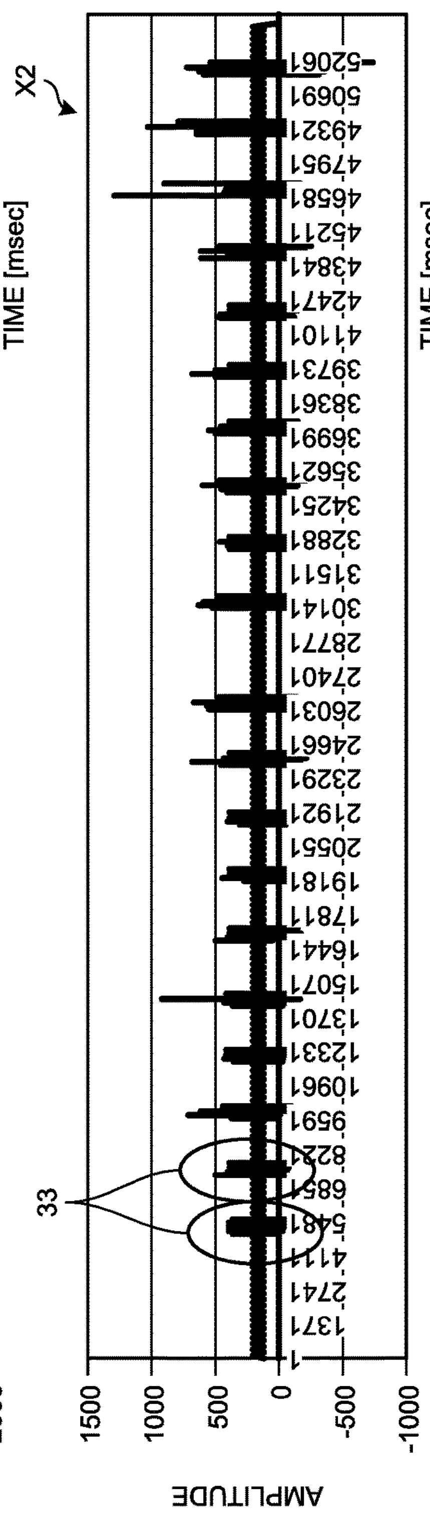
Figure 6C:
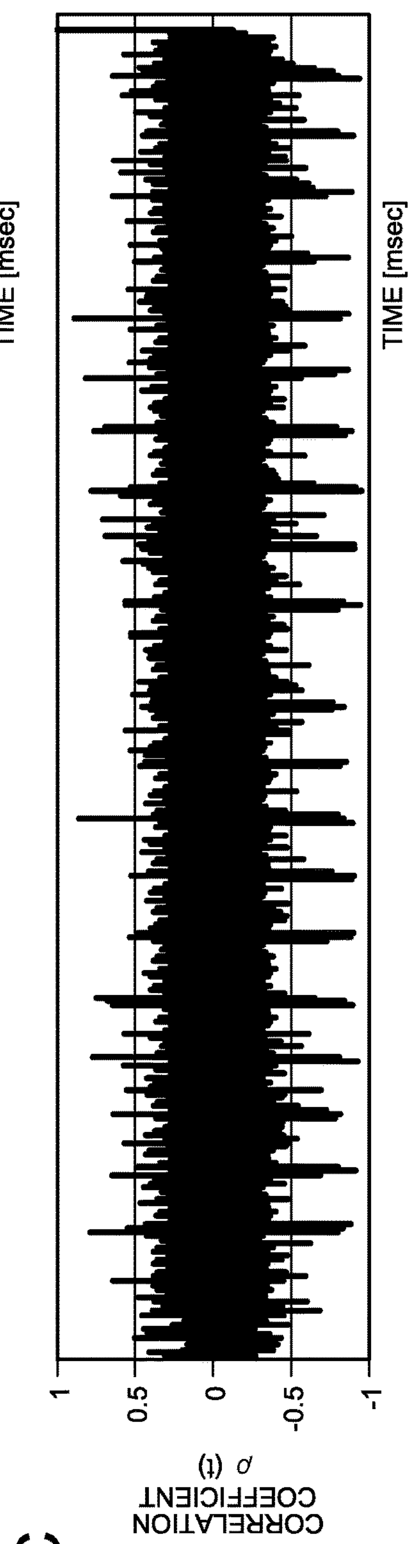

Here, for example, the correlation value of acceleration signals of at least one axis can be used as the similarity between the first waveform and the second waveform. FIGS. 6A, 6B, and 6C illustrate the correlation between movements of a worker and an object, in which FIG. 6A illustrates a waveform X1 of an acceleration signal in the x-axis direction of the right upper arm when a worker repeats the motion of opening and closing a door or a drawer in the kitchen or the motion of grabbing a cup, and FIG. 6B illustrates a waveform X2 of an acceleration signal in the x-axis direction of the cup (object) grabbed by the worker. FIG. 6C represents the result of calculating a correlation coefficient ρ(t) between the waveform X1 and the waveform X2 in the segment of a predetermined period of time T2 (for example 1000 msec) at each time.

As illustrated in FIG. 6B, in a segment 33 corresponding to an event in which the person grabs the cup, a large variation occurs in the waveform X2. It can be understood from FIG. 6C that the negative correlation coefficient becomes large in synchronization with the segment 33. It therefore can be construed that, in this segment 33, the waveform X1 representing human movement and waveform X2 representing movement of the cup (object) have high similarity.

As described above, the similarity between the waveform data representing human movement and the waveform data representing object movement can be defined, for example, as the correlation coefficient ρ(t) of those waveforms. The detecting unit 122 then calculates the correlation coefficient ρ(t) between the first waveform representing movement of the worker measured by the first sensor unit 10 and the second waveform representing movement of the tool measured by the second sensor unit 20 and detects the segment in which the absolute value of the correlation coefficient ρ(t) is equal to or greater than a threshold Th1, as a corresponding segment in which the first waveform pattern and the second waveform pattern are similar.

Figures 7, 8:
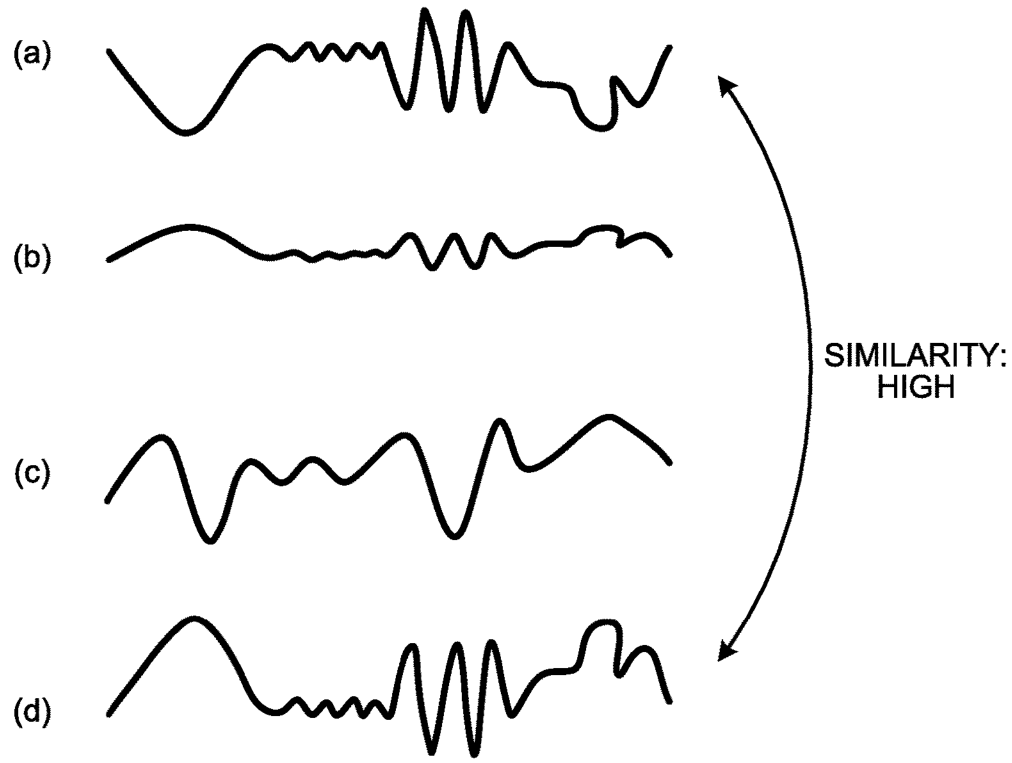
FIG. 7 is a diagram illustrating similarity of waveforms.
FIG. 8 is a diagram illustrating an example of object association information.

The similarity of waveforms may be defined such that the more similar the amount of amplitude change or the frequency of waveforms, the higher the similarity. FIG. 7 illustrates an example in which the similarity is determined by the amount of amplitude change and the frequency of waveforms, in which a section (a) of FIG. 7 illustrates a waveform serving as a reference, a section (b) of FIG. 7 illustrates a waveform similar to the waveform in the section (a) of FIG. 7 in terms of frequency but different in terms of amplitude change, a section (c) of FIG. 7 illustrates a waveform similar to the waveform in the section (a) of FIG. 7 in terms of amplitude change but different in terms of frequency, and a section (d) of FIG. 7 illustrates a waveform similar to the waveform in the section (a) of FIG. 7 both in terms of amplitude change and frequency. In the example illustrated in FIG. 7, the waveform illustrated in the section (a) of FIG. 7 and the waveform illustrated in the section (d) of FIG. 7 is calculated to have highest similarity. Specific examples of the index other than the correlation coefficient described above are described as follows. The spectrograms, and the difference in power distribution of waves of frequencies may be calculated as an index from the waveforms based on time-frequency analysis. Alternatively, the waveforms in a segment of a predetermined period of time T2 may be transformed, for example, by Fourier transform into frequency domains, and the correlation coefficient of the transformed outputs may be used as an index.

For example, the associating unit 123 associates information specifying the corresponding segment in the first time-series data detected by the detecting unit 122 with information specifying the worker (an example of the first object) corresponding to the first time-series data and information specifying the tool (an example of the second object) corresponding to the second time-series data. The result of association by the associating unit 123 is stored as object association information 180 into the storage device 103 or the like.

FIG. 8 is a diagram illustrating an example of the object association information 180 stored in the storage device 103 or the like. FIG. 8 illustrates an example of the object association information 180 in which the start time and the end time that specify the corresponding segment detected by the detecting unit 122 are associated with a worker ID specifying a worker and a tool ID specifying a tool. The worker ID is an ID uniquely assigned to the worker wearing the first sensor unit 10, and its association with the device ID of the first sensor unit 10 is stored to enable identification of the worker ID of the worker wearing the first sensor unit 10, for example, using the device ID sent together with the waveform data from the first sensor unit 10. The tool ID is an ID uniquely assigned to the tool having the second sensor unit 20 attached thereto, and its association with the device ID of the second sensor unit 20 is stored to enable identification of the tool ID of the tool having the second sensor unit 20 attached thereto, for example, using the device ID sent together with the waveform data from the second sensor unit 20.

The object association information 180 is any information specifying the corresponding segment with the date specifying the first object and the data specifying the second object, and is not limited to the configuration illustrated in FIG. 8. For example, the length (period of time) of the corresponding segment may be used as the information specifying the corresponding segment, instead of the start time and the end time. The device ID of the first sensor unit 10 may be used instead of the worker ID, and the device ID of the second sensor unit 20 may be used instead of the tool ID. In the case of the configuration in which the detecting unit 122 detects a corresponding segment based on the similarity between the first waveform and the second waveform as described above, the similarity between the first waveform pattern and the second waveform pattern in the corresponding segment may be included in the object association information 180. In the present embodiment, it is assumed that the object association information 180 is used for generating learning data for constructing an estimator that estimates the operating motion of a certain worker, as will be described later. The object association information 180 thus does not necessarily include the information specifying the first object such as a worker ID.

The second processing unit 130 is a processing unit that executes each process equivalent to the process B and includes a generating unit 131 and a constructing unit 132.

The generating unit 131 generates learning data for constructing an estimator that estimates the kind of a worker's operating motion, based on the object association information 180. The generating unit 131 receives first time-series data in time-series data 170 stored by the acquisition unit 110 in the storage device 103 or the like, and the start time, the end time, and the tool ID in the object association information 180 stored in the storage device 103 or the like. The generating unit 131 uses the input information to generate learning data in which the first time-series data is labelled with the tool ID as operating motion label.

Figure 9:
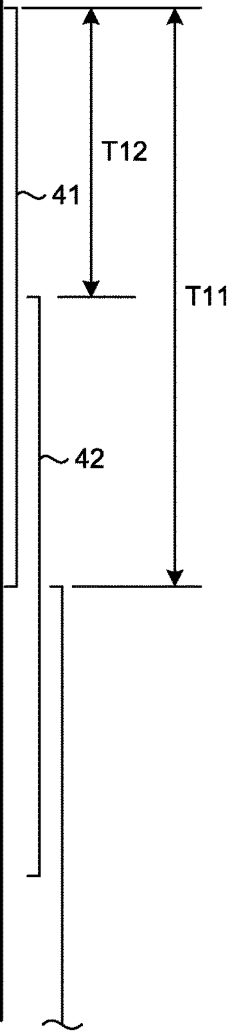
FIG. 9 is a diagram illustrating an example of the method of generating learning data.

FIG. 9 is a diagram illustrating an example of the method of generating learning data. For example, as illustrated in FIG. 9, the generating unit 131 first generates data with tool ID label, for each time of the first time-series data of the three-axis acceleration measured by the first sensor unit 10. Here, a tool ID related to the corresponding segment is added as a label to the time included in the corresponding segment detected by the detecting unit 122, and a label "NULL" which means that no tool is used is added to the time that is out of range of the corresponding segment.

Next, the generating unit 131 extracts data in the analysis window of a predetermined time length T11 from the first time-series data labelled for each time as described above while shifting the data for a predetermined period of time T12 and sets the extracted data as data for estimator input. FIG. 9 illustrates an example in which data for estimator input is extracted where the time length T11 of the analysis window is set to 200 msec and the predetermined period of time T12 is set to 100 msec. However, the time lengths of T11 and T12 can be set to the optimum values by the designer depending on the kind of operation to be analyzed.

Next, the generating unit 131 determines a representative label for estimator output related to the data for estimator input extracted as described above. When the same label is assigned at each time in the analysis window described above, that label is the representative label. For example, the representative label related to the data in the analysis window 42 in FIG. 9 is "electric screwdriver". On the other hand, when many kinds of labels are assigned in the analysis window, if the proportion of the time in which any one of the labels is added to the time length T11 of the analysis window is equal to or greater than a threshold Th2, the label is set as a representative label, for example. When no label satisfies this condition, it is assumed that various kinds of operations are mixed and the window is difficult to analyze, and the representative label is "NULL". The threshold Th2 is set, for example, to 60%. In this case, the representative label related to the data in the analysis window 41 in FIG. 9 is "NULL".

As described above, the generating unit 131 generates a combination of data for estimator input extracted from the first time-series data labelled for each time and the representative label for estimator output, as learning data for constructing the estimator through machine learning.

The constructing unit 132 constructs an estimator through machine learning using the learning data generated by the generating unit 131. In constructing an estimator, the constructing unit 132 inputs the first time-series data in the analysis window to a deep learning network and uses the representative label related to the first time-series data as a teacher label to learn the number of layers of the network and parameters of weights.

The computer program and the parameters of the estimator constructed by the constructing unit 132 (the estimator 190 in FIG. 4) are stored in the storage device 103 or the like. Information such as the predetermined time length T11 and the predetermined period of time T12, which are parameters of the analysis window, is also stored in the storage device 103 or the like.

The third processing unit 140 is a processing unit that executes the process equivalent to the above-noted process C and includes an estimating unit 141.

The estimating unit 141 estimates the operating motion of the worker, based on the computer program and the parameters of the estimator (the estimator 190 in FIG. 4) constructed by the constructing unit 132 and stored in the storage device 103 or the like, using the first time-series data corresponding to movement of the worker measured by the first sensor unit 10 as input.

The estimating unit 141 receives the first time-series data acquired by the acquisition unit 110. The estimating unit 141 refers to the predetermined time length T11 and the predetermined period of time T12 stored in the storage device 103 or the like and successively extracts data of the segment length matched with the data format of the estimator constructed by the constructing unit 132, from the input first time-series data. The estimating unit 141 then estimates the motion of the worker, from the label output based on the computer program and the parameters of the estimator (the estimator 190 in FIG. 4) stored in the storage device 103 or the like, using the extracted data as input to the estimator.

Figure 10:
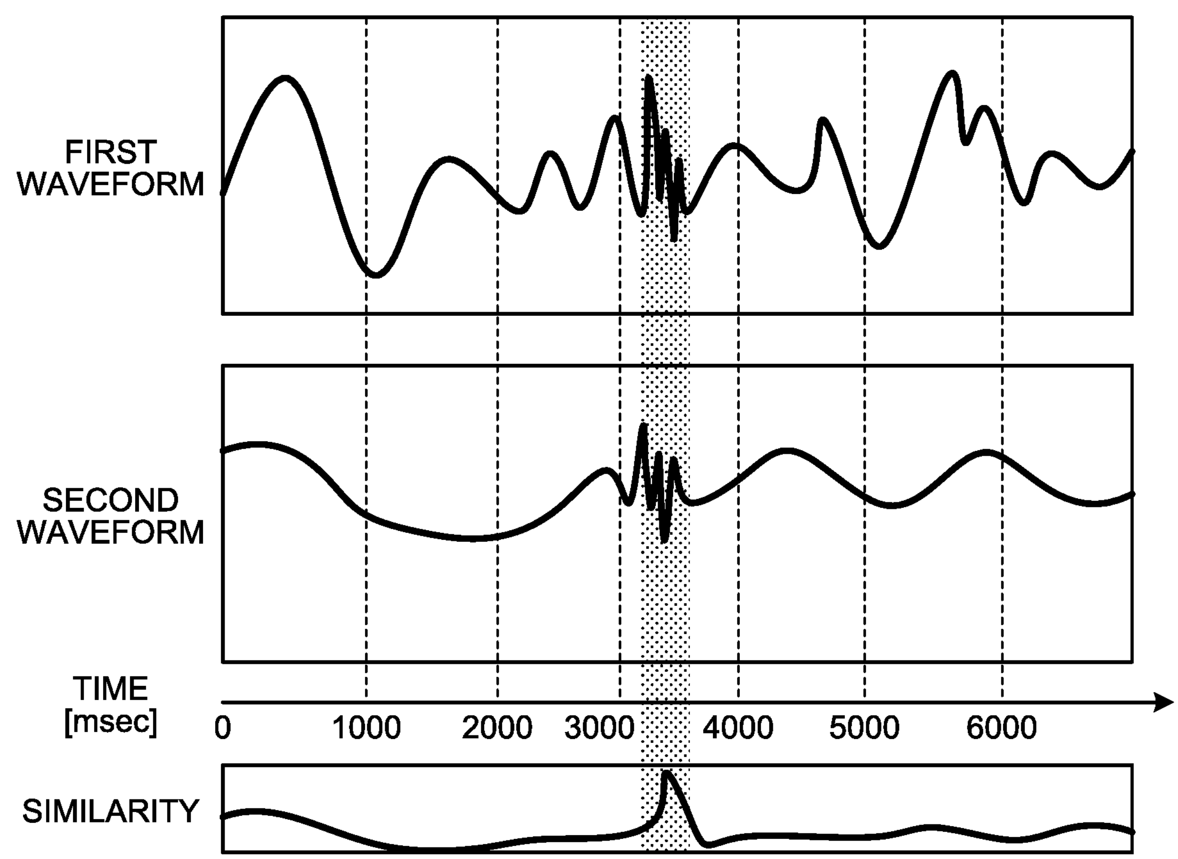
FIG. 10 is a diagram illustrating an example of information displayed by an output unit on a display.

The output unit 150 outputs the result from the motion analysis apparatus 100 of the present embodiment. The output unit 150, for example, may display the result from the motion analysis apparatus 100 on the display 106 or may transmit the result from the motion analysis apparatus 100 to an external device through the communication I/F 105 and allow the external device to display the process result. In the process C, the output unit 150 can display information representing the operating motion of the worker estimated by the estimating unit 141 on the display 106 or the like. In the process A, for example, as illustrated in FIG. 10, the output unit 150 may display the first waveform and the second waveform on the display 106 in such a form that highlights the corresponding segment having a high similarity between those waveforms or may display the waveforms together with the similarity therebetween on the display 106.

As explained in detail above with specific examples, the present embodiment focuses on the similarity between the first time-series data corresponding to movement of the worker (an example of the first object) and the second time-series data corresponding to movement of the tool (an example of the second object) to automatically perform separation of the segment in which the worker is performing operation using the tool in those time-series data and labelling on the time-series data. The present embodiment also can automatically generate learning data for constructing an estimator that estimates motion of the worker through machine learning, using the thus labelled time-series data, thereby significantly reducing the burden of operation for generating learning data and enabling quick introduction of the motion analysis apparatus 100 in the field for operation improvement.

First Modification

Figure 11:
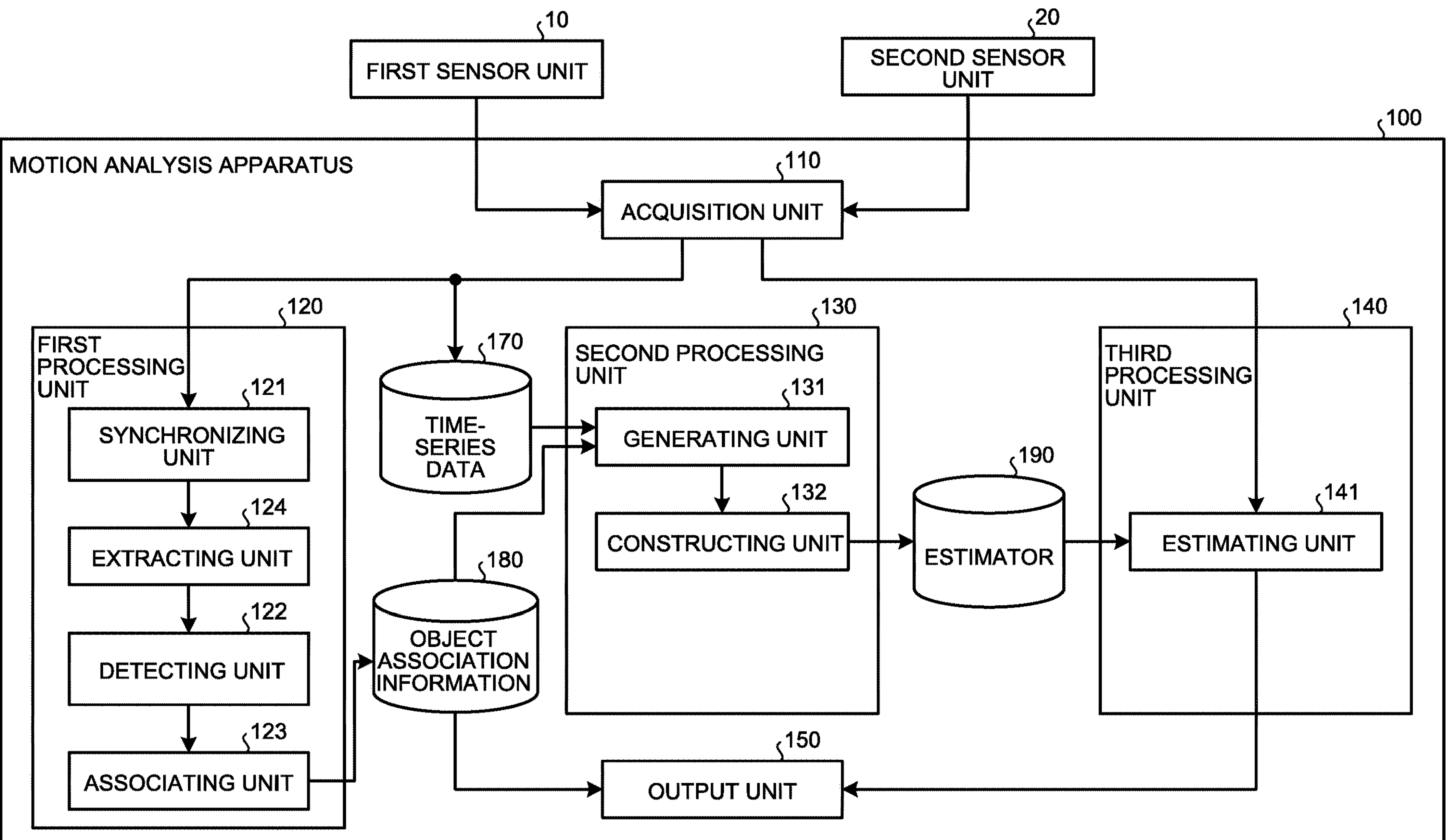
FIG. 11 is a block diagram illustrating a functional configuration example of the motion analysis apparatus of a first modification.

As illustrated in FIG. 11, the motion analysis apparatus 100 of the present embodiment may include an extracting unit 124 in the first processing unit 120, and the detecting unit 122 may detect the corresponding segment using a motion segment extracted by the extracting unit 124.

Figure 12:
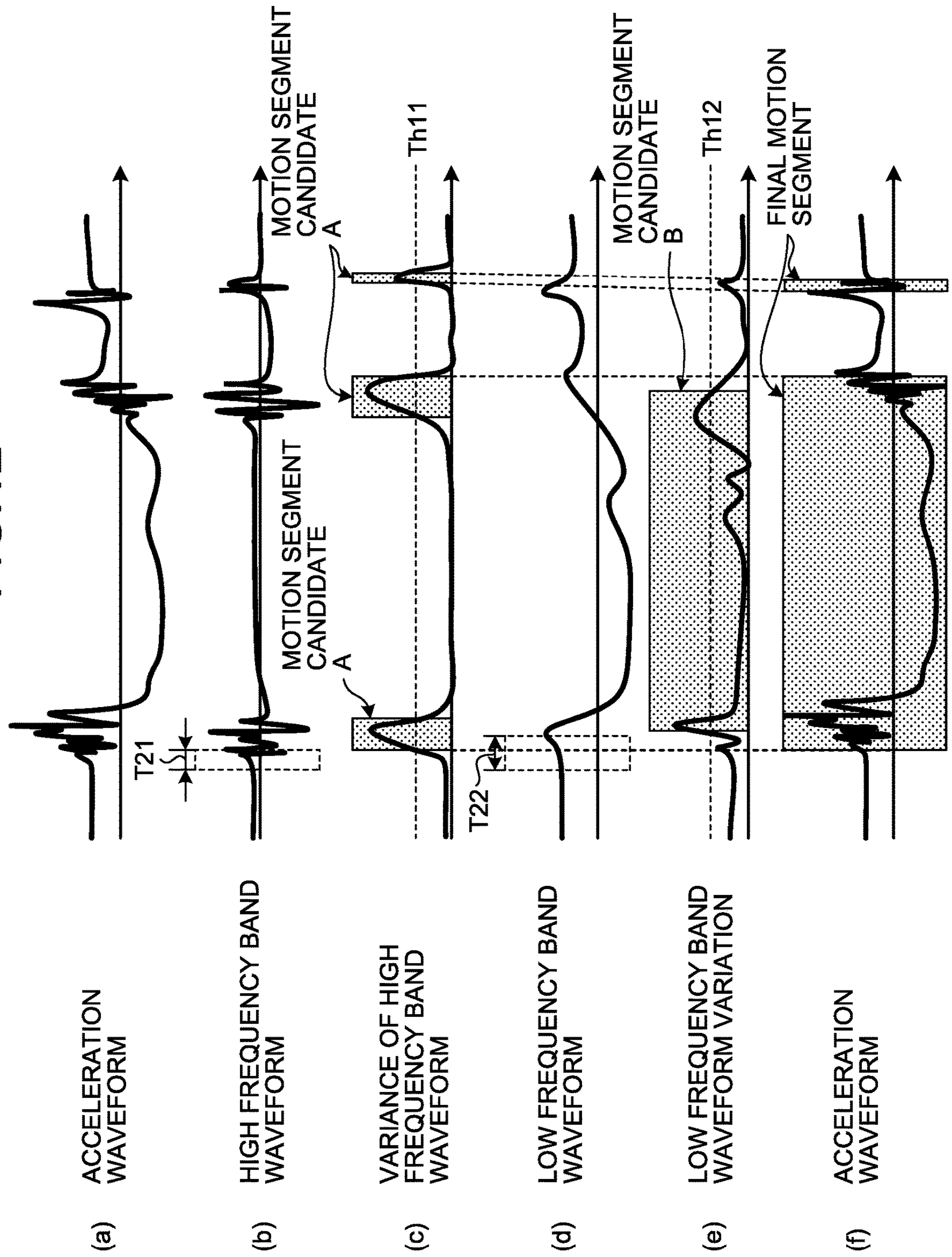
FIG. 12 is a diagram illustrating the process by a extracting unit.

The extracting unit 124 extracts a motion segment in which there is presumably movement, from at least one of the first time-series data and the second time-series data. FIG. 12 is a diagram illustrating the process by the extracting unit 124. As illustrated in FIG. 12, the extracting unit 124 performs differential operation on at least one of a first waveform representing the first time-series data and a second waveform representing the second time-series data (here the acceleration waveform illustrated in a section (a) of FIG. 12) to obtain a high frequency band waveform as illustrated in a section (b) of FIG. 12. In place of differential operation, for example, a high pass filter with a cutoff frequency of 10 Hz may be used to obtain a high frequency band waveform as illustrated in the section (b) of FIG. 12. The extracting unit 124 then obtains a variance (an example of the statistical quantity), using an analysis window of a past predetermined segment T21, at each time in this high frequency band waveform, and sets the segment in which the variance is equal to or greater than a threshold Th11 as a motion segment candidate A (a section (c) of FIG. 12).

The extracting unit 124 also obtains a low frequency band waveform as illustrated in a section (d) of FIG. 12, for example, using a low pass filter with a cutoff frequency of 5 Hz for at least one of the first waveform representing the first time-series data and the second waveform representing the second time-series data (acceleration signal waveform illustrated in the section (a) of FIG. 12). The extracting unit 124 then calculates a variation as a variance of the data in the analysis window of the past predetermined segment T22, at each time in the low frequency band waveform, and sets a segment in which the variation is equal to or greater than a threshold Th12 and a segment in which the variation falls below the threshold Th12 and subsequently becomes equal to or greater than the threshold Th12 and that has a segment length equal to or smaller than a threshold Th13, as a motion segment candidate B (a section (e) of FIG. 12). The threshold Th13 is determined depending on the kind of intended motion and in this example set, for example, to 15000 msec.

The extracting unit 124 then extracts a segment that fits in at least one of the motion segment candidate A and the motion segment candidate B as a final motion segment (a section (f) of FIG. 12) and extracts this motion segment from the first time-series data or the second time-series data.

Figure 13:
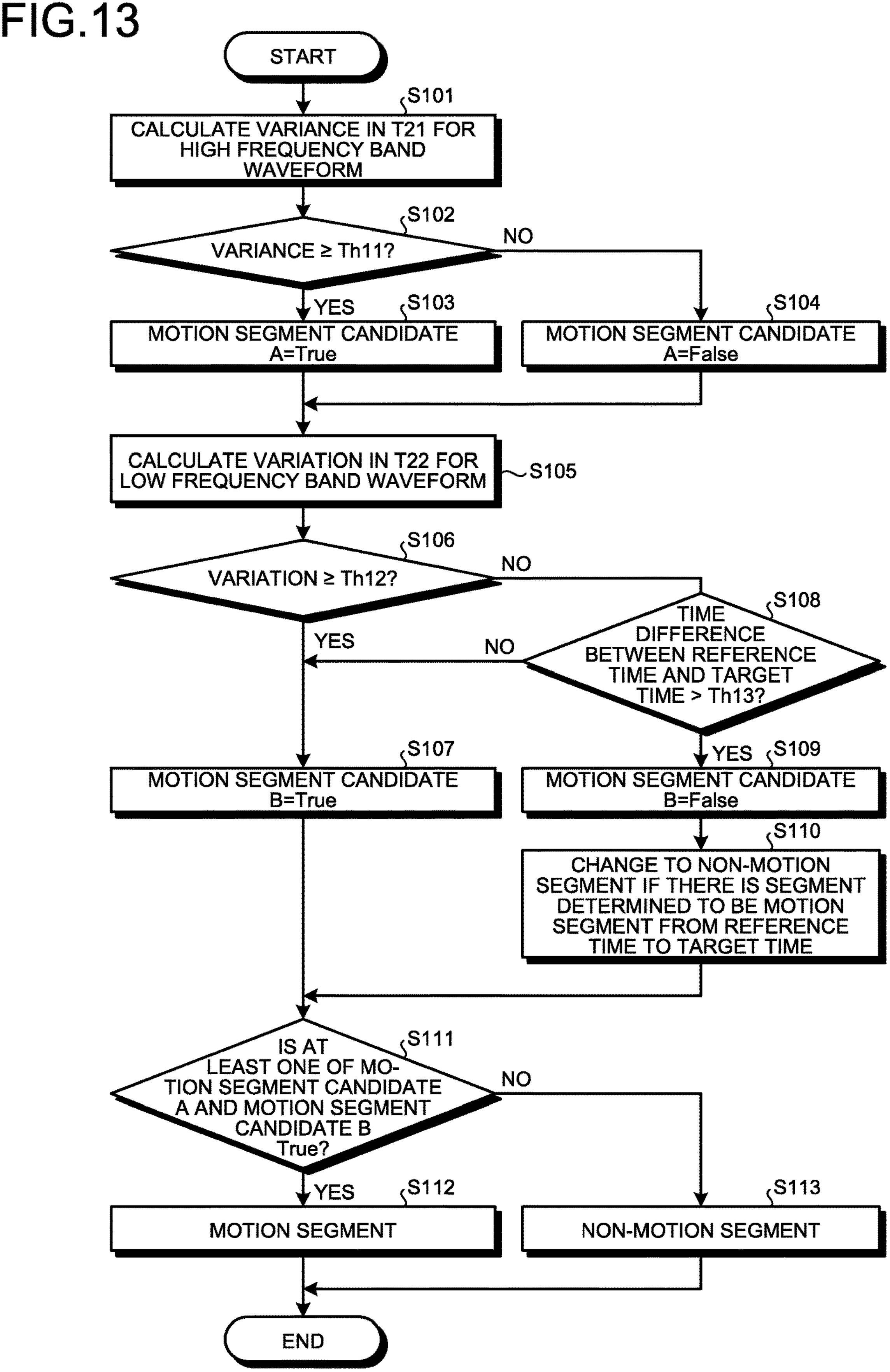
FIG. 13 is a flowchart illustrating an example of the procedure by the extracting unit.

FIG. 13 is a flowchart illustrating an example of the procedure in the extracting unit 124 performed repeatedly at each time in the first time-series data or the second time-series data. The extracting unit 124 extracts the motion segment as illustrated in the section (f) of FIG. 12 by repeatedly performing the process illustrated in the flowchart in FIG. 13 at each time in the first time-series data or the second time-series data, using the high frequency band waveform as illustrated in the section (b) of FIG. 12 and the low frequency band waveform as illustrated in the section (d) of FIG. 12. The time targeted by the process illustrated in the flowchart in FIG. 13 is hereinafter referred to as "target time" for the sake of convenience.

When the process illustrated by the flowchart in FIG. 13 is started, first of all, the extracting unit 124 calculates a variance in the analysis window of the past predetermined segment T21 from the target time for the high frequency band waveform illustrated in the section (b) of FIG. 12 (step S101). If the calculated variance is equal to or greater than the threshold Th11 (Yes at step S102), motion segment candidate A=True is held for the target time (step S103). On the other hand, if the calculated variance is smaller than the threshold Th11 (No at step S102), motion segment candidate A=False is held for the target time (step S104).

The extracting unit 124 also calculates a variation using the analysis window of the past predetermined segment T22 from the target time, for the low frequency band waveform illustrated in the section (d) of FIG. 12 (step S105). If the calculated variation is equal to or greater than the threshold Th12 (Yes at step S106), motion segment candidate B=True is held for the target time (step S107). On the other hand, if the variation is smaller than the threshold Th12 (No at step S106), the preceding time (referred to as "reference time") that is the time prior to the target time and when the variation is equal to or greater than the threshold Th12 is specified, and the time difference from the reference time to the target time is compared with the threshold Th13. If the time difference between the reference time and the target time is equal to or smaller than the threshold Th13 (No at step S108), motion segment candidate B=True is held for the target time (step S107). On the other hand, if the time difference between the reference time and the target time is greater than the threshold Th13 (Yes at step S108), motion segment candidate B=False is held for the target time (step S109), and if there is a segment determined to be a motion segment from the reference time to the target time, that segment is changed to a non-motion segment (step S110).

Thereafter, the extracting unit 124 refers to the value of the motion segment candidate A and the value of the motion segment candidate B at the target time, and, if at least one of them is True (Yes at step S111), determines that the target time is a motion segment (step S112). The process then ends. On the other hand, if both of the value of the motion segment candidate A and the value of the motion segment candidate B at the target time are False (No at step S111), it is determined that the target time is a non-motion segment (step S113), and the process then ends.

The detecting unit 122 in the present modification detects a corresponding segment, using the motion segment extracted from at least one of the first time-series data and the second time-series data by the extracting unit 124. When the motion segment is extracted from the first time-series data alone, the detecting unit 122 compares the motion segment extracted from the first time-series data with the second time-series data and detects a segment in which the similarity to the motion segment extracted from the first time-series data is equal to or greater than the reference value in the second time-series data, as a corresponding segment. When the motion segment is extracted from the second time-series data alone, the detecting unit 122 compares the motion segment extracted from the second time-series data with the first time-series data and detects a segment in which the similarity to the motion segment extracted from the second time-series data is equal to or greater than the reference value in the first time-series data, as a corresponding segment.

When a motion segment is extracted from both the first time-series data and the second time-series data, the detecting unit 122 detects the motion segment extracted from the first time-series data and the motion segment extracted from the second time-series data, as a corresponding segment, if the similarity between those motion segments exceeds the reference value.

If the time difference between the start time of the motion segment extracted from the first time-series data and the start time of the motion segment extracted from the second time-series data and the time difference between the end time of the motion segment extracted from the first time-series data and the end time of the motion segment extracted from the second time-series data are both smaller than a predetermined threshold Th21 (for example, 500 msec) and if those motion segments can be considered to be synchronized with each other, these motion segments may be detected as a corresponding segment, because these motion segments can be considered as segments in which the pattern of first waveform based on the first time-series data and the pattern of second waveform based on the second time-series data cooccur. In this case, the sum of the time difference in start time and the time difference in end time of those motion segments may be treated in the same manner as the similarity between the first waveform and the second waveform described above and included in the object association information 180.

As described above, the present modification extracts a motion segment in which there is presumably movement from at least one of the first time-series data and the second time-series data and detects a corresponding segment using the extracted motion segment. This configuration enables detection of the corresponding segment with higher accuracy and low costs.

Second Modification

As illustrated in FIG. 14, the motion analysis apparatus 100 of the present embodiment may include calculating units 134 and 142 in the second processing unit 130 and the third processing unit 140, respectively, and generation of learning data and estimation of label of tool operating motion may be performed using the feature calculated from the first time-series data. At least one of the amplitude average value, variance, and standard deviation value of the waveform in the analysis window, the amplitude average value or variance of the waveform in the high frequency band and the low frequency band, and the frequency value having the maximum power value after frequency analysis can be used as the feature calculated from the first time-series data.

The generating unit 131 in the present modification passes data in the analysis window extracted from the first time-series data labelled for each time as illustrated in FIG. 9 to the calculating unit 134 and receives the feature calculated by the calculating unit 134. Then, a combination of the feature calculated by the calculating unit 134 and the representative label is generated as learning data. In this case, the constructing unit 132 can construct an estimator based on a classification algorithm such as support vector machines and backpropagation, using the learning data generated by the generating unit 131.

The estimating unit 141 in the present modification receives the feature calculated by the calculating unit 142 from the first time-series data acquired by the acquisition unit 110. The feature calculated by the calculating unit 142 is the same as the feature calculated by the calculating unit 134. The calculating unit 142 refers to the predetermined time length T11 or the predetermined period of time T12 stored in the storage device 103 or the like and calculates the feature of data in the segment length matched with the data format of the estimator constructed by the constructing unit 132 from the first time-series data acquired by the acquisition unit 110 to input the calculated feature to the estimating unit 141. The estimating unit 141 estimates the tool-operating motion of the worker, using this feature as input to the estimator, from the label output based on the computer program and the parameters of the estimator stored in the storage device 103 or the like (estimator 190 in FIG. 14).

As described above, the present modification performs generation of learning data and estimation of motion using the feature calculated from the first time-series data. This configuration enables construction of the estimator based on a classification algorithm.

Second Embodiment

In the present embodiment, when it is assumed that many workers use the same tool, when and which worker uses the tool are specified based on a plurality of first time-series data from the first sensor units 10 attached to each worker and second time-series data from the second sensor unit 20 attached to the tool. The foregoing first embodiment detects a corresponding segment between the first time-series data and the second time-series data and labels the first time-series data for the purpose of generating learning data to be used to construct an estimator, whereas the present embodiment detects a corresponding segment between any one of a plurality of first time-series data and the second time-series data and labels the second time-series data, mainly for the purpose of recording the use history of the tool used by various workers.

Figure 15:
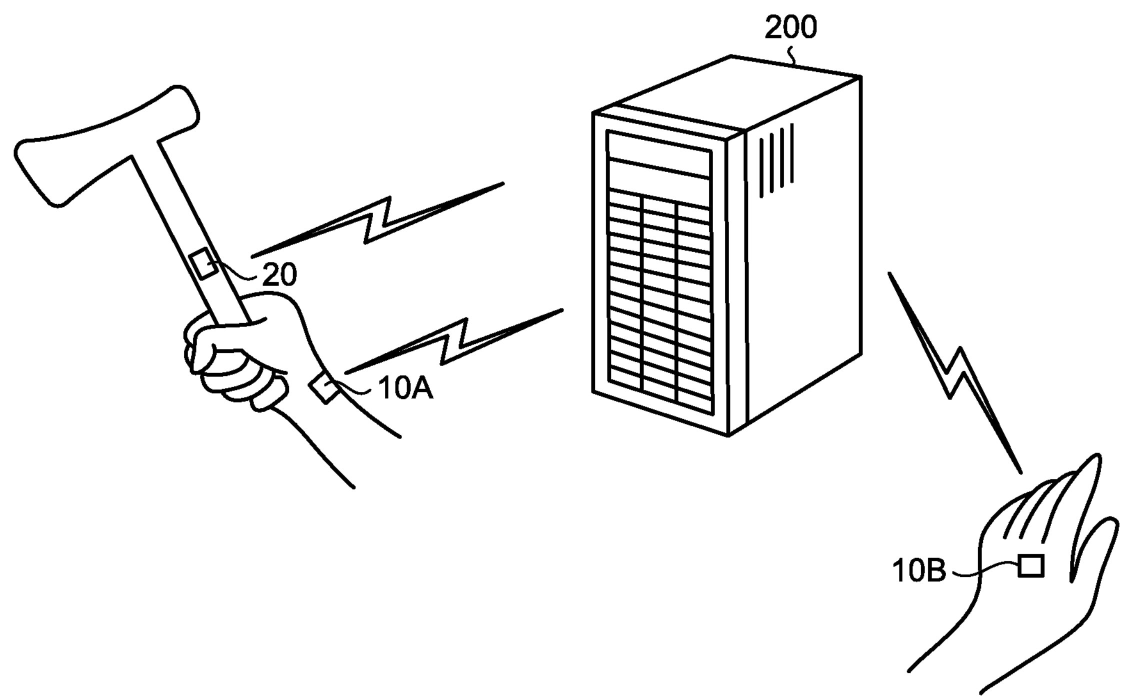
FIG. 15 is a diagram illustrating an overview of a motion analysis apparatus of a second embodiment.

FIG. 15 is a diagram illustrating an overview of a motion analysis apparatus 200 of the present embodiment. As illustrated in FIG. 15, the motion analysis apparatus 200 of the present embodiment receives time-series data related to motion of a worker and motion of a tool from each of a plurality of first sensor units 10 (10A, 10B) attached to each worker (an example of the first object) and a second sensor unit 20 attached to the same tool (an example of the second object) used by these workers. The motion analysis apparatus 200 of the present embodiment then detects a corresponding segment in which a waveform pattern is similar to or cooccurs with any one of first time-series data corresponding to workers in the second time-series data corresponding to movement of the tool and stores the object association information 180 that associates the values of the corresponding segment in the second time-series data with information specifying any one of a plurality of workers into the storage device 103 or the like. Although FIG. 15 illustrates two first sensor units 10A, 10B, more first sensor units 10 may be used in accordance with the number of workers who use the same tool.

Figure 16:
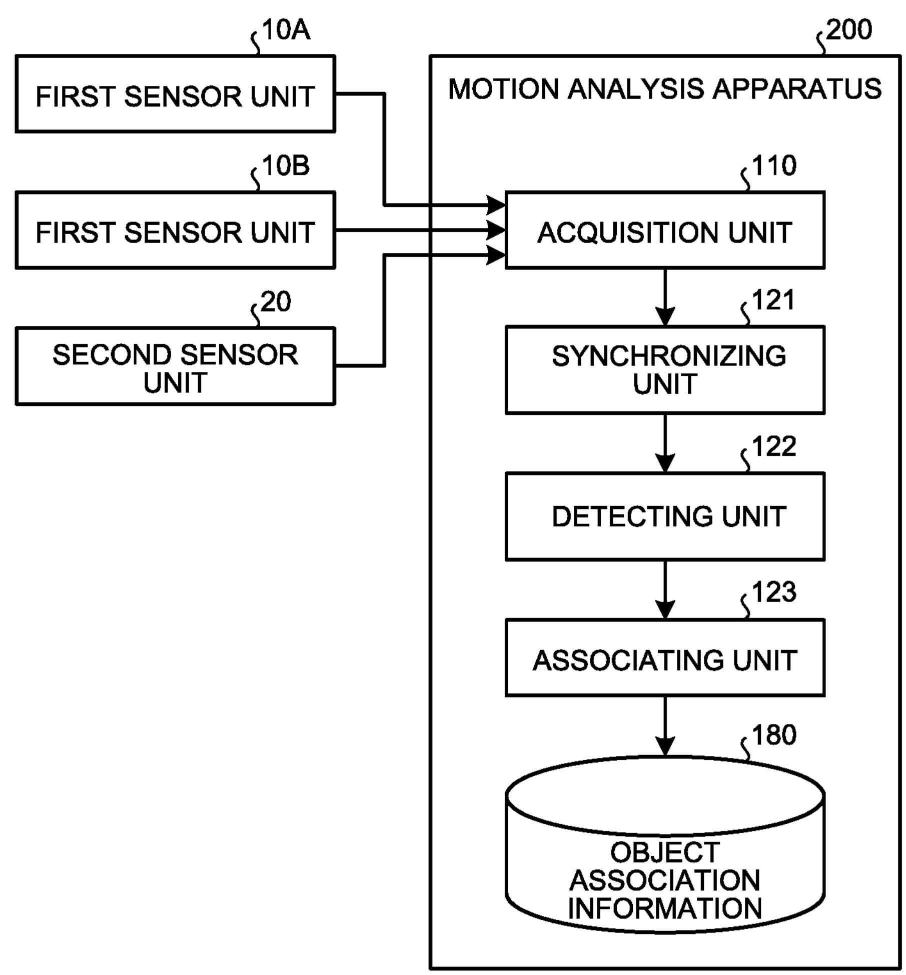
FIG. 16 is a block diagram illustrating a functional configuration example of the motion analysis apparatus of the second embodiment.

FIG. 16 is a block diagram illustrating a functional configuration example of the motion analysis apparatus 200 of the present embodiment. For example, as illustrated in FIG. 16, the motion analysis apparatus 200 of the present embodiment includes, as functional components implemented through cooperation of the hardware illustrated in FIG. 3 with software (computer program), an acquisition unit 110, a synchronizing unit 121, a detecting unit 122, and an associating unit 123. The configuration may further include an extracting unit 124 as in the foregoing first modification of the first embodiment.

The acquisition unit 110 acquires first time-series data and second time-series data in the same manner as in the first embodiment. The synchronizing unit 121 time-synchronizes the first time-series data with the second time-series data in the same manner as in the first embodiment.

In the present embodiment, however, the acquisition unit 110 acquires first time-series data corresponding to some workers that are transmitted from some first sensor units 10A, 10B, and the synchronizing unit 121 time-synchronizes those first time-series data with the second time-series data.

The detecting unit 122 detects a corresponding segment in which the waveform patterns of any one of first time-series data and second time-series data are similar or co-occur. The second time-series data are synchronized with each first time-series data by the synchronizing unit 121. The detecting unit 122 in the present embodiment may detect a corresponding segment from the second time-series data by the similar method in the first embodiment described above.

The associating unit 123 associates information about the corresponding segment in the second time-series data detected by the detecting unit 122 with information specifying the tool corresponding to the second time-series data and information specifying the worker corresponding to the first time-series data in which the waveform patterns are similar or co-occur in the corresponding segment. The result of association by the associating unit 123 is stored as object association information 180 into the storage device 103 or the like.

Figures 17, 18:
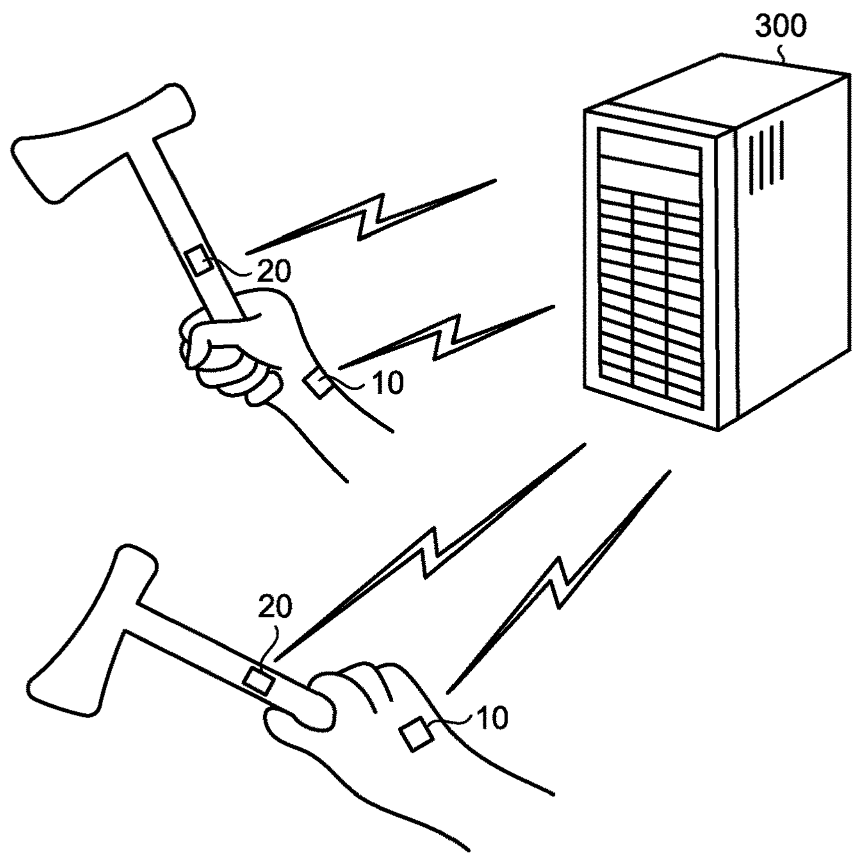
FIG. 17 is a diagram illustrating an example of object association information.
FIG. 18 is a diagram illustrating an overview of a motion analysis apparatus of a third embodiment.

FIG. 17 is a diagram illustrating an example of the object association information 180 stored in the storage device 103 or the like. FIG. 17 illustrates an example of the object association information 180 in which the start time and the end time that specify the corresponding segment detected by the detecting unit 122 are associated with a tool ID for specifying a tool and a worker ID for specifying a worker. The length (period of time) of the corresponding segment may be used as the information about the corresponding segment, instead of one of the start time and the end time. The device ID of the first sensor unit 10 may be used instead of a worker ID, and the device ID of the second sensor unit 20 may be used instead of a tool ID.

As described above, the present embodiment can automatically separate into the time-segment and apply a label indicating which worker has used the tool, about the second time-series data related movement of the tool used by a plurality of workers. This configuration can improve motion analysis in an efficient way.

In the example described above, a first sensor unit 10 is attached to each of a plurality of workers. Alternatively, first sensor units 10 may be attached to different parts of body of one worker and utilized to analyze how the worker uses the tool. Alternatively, a second sensor unit 20 may be attached to an object other than the tool, such as operating facility in the field, to enable grasping of the use history of the object.

Third Embodiment

In the present embodiment, at least one of the similarity between the first waveform patterns and the second waveform patterns in the detected corresponding segment and the feature calculated from the time-series data in this corresponding segment is classified into a designated number of clusters, and object association information 180 including the classification result is stored into the storage device 103 or the like.

FIG. 18 is a diagram illustrating an overview of a motion analysis apparatus 300 of the present embodiment. As illustrated in FIG. 18, the postures of the worker and the tool change depending on grabbing method related to the fatigue state and the level of skill of the worker and whether the worker properly uses the tool. Therefore, for example, when a three-axis acceleration sensor is used, it may change which channel has high correlation value as the similarity in the corresponding segment. For example, even when the worker moves in the same way and his/her acceleration waveform is similar, the acceleration waveform of the tool may change dynamically if he/she grasp the tool in the different method. Similarly, even when the trajectory of the tool movement and the acceleration waveform are similar, the acceleration waveform of the worker varies if the grasping method is different. Furthermore, when the same tool is used for different purposes, the both acceleration waveforms of the worker and the tool, the kind of channels with high similarity, and the like may change widely.

The present embodiment classifies information obtained by analyzing the similarity in waveform patterns between the first time-series data and the second time-series data, that is, at least one of the similarity in the corresponding segment and the feature calculated from the time-series data in this corresponding segment into a designated number of clusters to enable analysis of the difference of the fatigue state, the level of skill of the worker, the use method, the use purpose of the tool, and the like.

Figure 19:
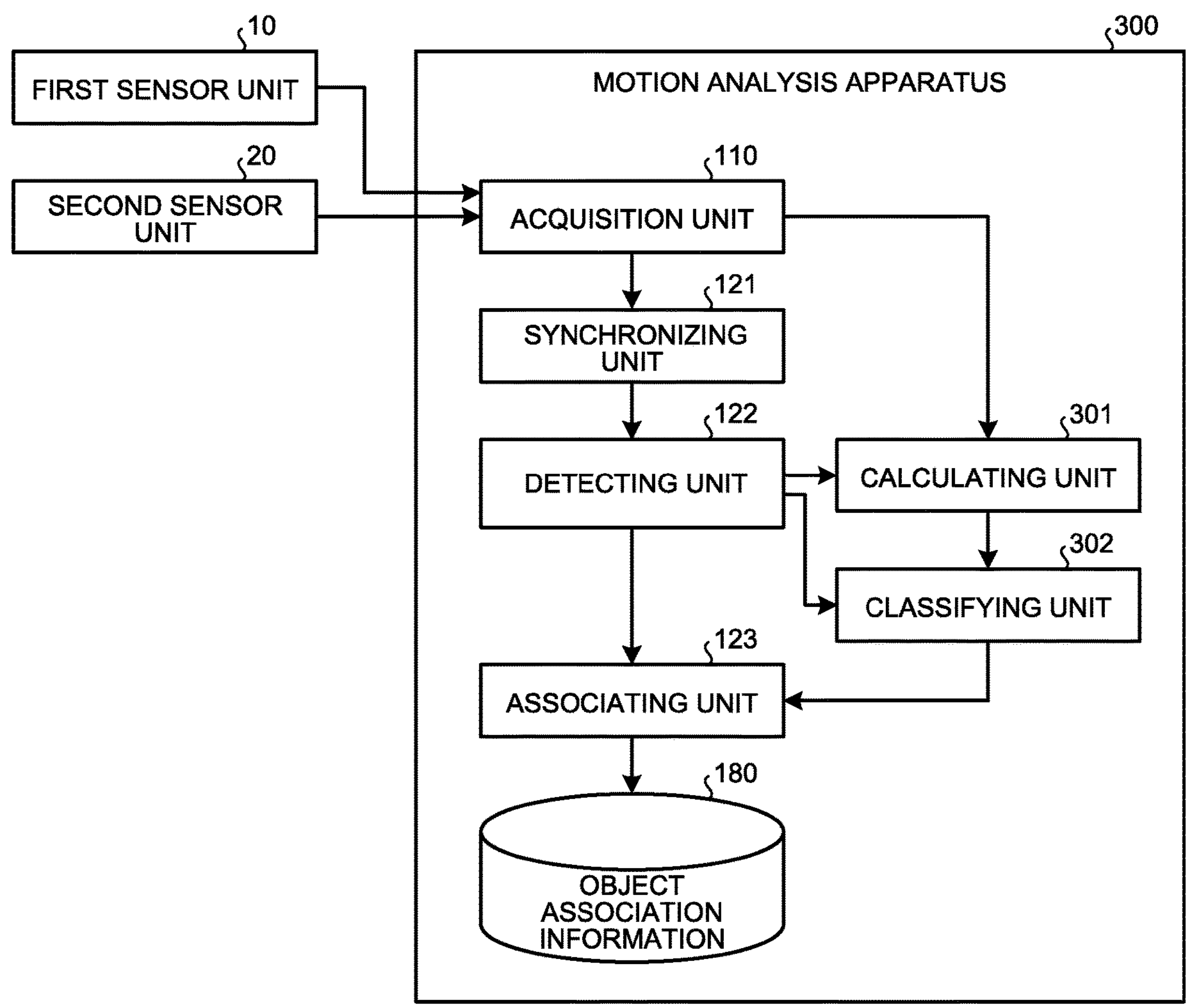
FIG. 19 is a block diagram illustrating a functional configuration example of the motion analysis apparatus of the third embodiment.

FIG. 19 is a block diagram illustrating a functional configuration example of the motion analysis apparatus 300 of the present embodiment. For example, as illustrated in FIG. 19, the motion analysis apparatus 300 of the present embodiment includes, as functional components implemented through cooperation of the hardware illustrated in FIG. 3 with software (computer program), an acquisition unit 110, a synchronizing unit 121, a detecting unit 122, an associating unit 123, a calculating unit 301, and a classifying unit 302. The configuration may further include an extracting unit 124 as in the foregoing first modification of the first embodiment.

The acquisition unit 110 acquires first time-series data and second time-series data in the same manner as in the first embodiment. The synchronizing unit 121 time-synchronizes the first time-series data with the second time-series data in the same manner as in the first embodiment. The detecting unit 122 detects a corresponding segment in which the waveform patterns are similar or cooccur in the first time-series data and the second time-series data, in the same manner as in the first embodiment.

The calculating unit 301 calculates a feature from at least one of the first time-series data and the second time-series data in the corresponding segment detected by the detecting unit 122. As used herein, the feature refers to at least one of the amplitude average value, variance, and standard deviation value of the waveform in the segment in which the similarity is high, the amplitude average value or variance of the waveform in the high frequency band and the low frequency band, and the frequency value having the maximum power value after frequency analysis.

The classifying unit 302 classifies at least one of the similarity in the corresponding segment detected by the detecting unit 122 and the feature calculated by the calculating unit 301 into a designated number of clusters. The number of clusters used in classification may be, for example, input through key input depending on how detailed the analysis should be by the user who analyzes the difference of the fatigue state and the level of skill of the worker and the using method and using purpose of the tool, or a fixed number may be designated in advance. For example, a known method such as the k-means method can be used for clustering by the classifying unit 302.

The associating unit 123 associates information about the corresponding segment detected by the detecting unit 122 with information about the worker corresponding to the first time-series data, information about the tool corresponding to the second time-series data, and the classification result by the classifying unit 302. The result of association by the associating unit 123 is stored as object association information 180 into the storage device 103 or the like.

Figure 20:
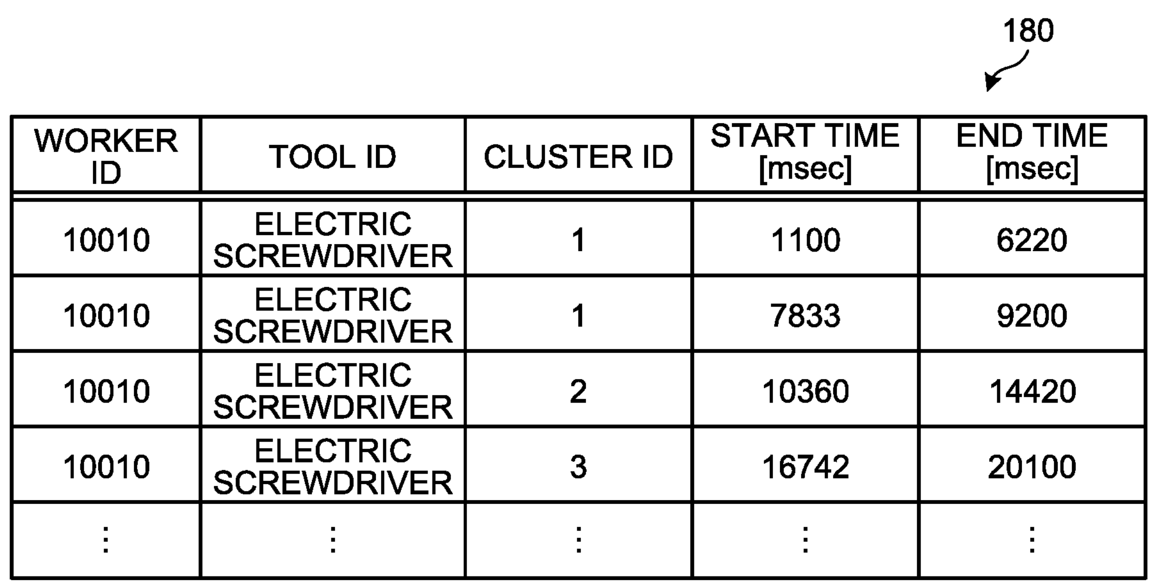
FIG. 20 is a diagram illustrating an example of object association information.

FIG. 20 is a diagram illustrating an example of the object association information 180 stored in the storage device 103 or the like. FIG. 20 illustrates an example of the object association information 180 in which the start time and the end time that specify the corresponding segment detected by the detecting unit 122 are associated with a worker ID specifying a worker, a tool ID specifying a tool, and a cluster ID indicating the classification result by the classifying unit 302. The length (period of time) of the corresponding segment may be used as information about the corresponding segment, instead of one of the start time and the end time. The device ID of the first sensor unit 10 may be used instead of a worker ID, and the device ID of the second sensor unit 20 may be used instead of a tool ID.

When the classifying unit 302 classifies the feature calculated by the calculating unit 301, the associating unit 123 may further associate the lower-dimensional values that are compressed form the multi-dimensional feature using self-organizing map or principal component analysis. The associating unit 123 stores the object association information 180 including the value of the lower-dimensional feature into the storage device 103 or the like. In this case, the value of the lower-dimensional feature included in the object association information 180 may be represented in a two-dimensional space and presented to the user to allow the user to understand the similarity of data by intuition.

As described above, the present embodiment classifies the information obtained by analyzing the similarity in waveform patterns between the first time-series data and the second time-series data into a designated number of clusters and stores the classification result. This configuration enables analysis of the difference of the fatigue state and the level of skill of the worker and the use method and the use purpose of the tool, and implements motion analysis in more details.

Supplemental Description

The foregoing embodiments are assumed to be used for analyzing motion of workers in the field, and the objects of which motion is to be measured include a first object that is a worker (person) and a second object that is a tool, part, operating facility in the field, and the like (object) used by the worker. The foregoing embodiments, however, are not limited to the use of analyzing motion of workers in the field and may be applied to various uses, and targets of which motion is to be measured serve as a first object and a second object. For example, when the first object is a robot and the second object is a tool used by the robot, the embodiments can be applied in analysis of the robot motion.

The motion analysis apparatuses 100, 200, 300 in the foregoing embodiments can be implemented, for example, by executing a predetermined computer program using a general computer. More specifically, the units illustrated as functional components of the motion analysis apparatuses 100, 200, 300 are included in the computer program executed by a computer, and one or more processors (processor 101 in FIG. 3) in the computer execute this computer program to generate the above-noted units on the main storage such as a RAM (internal memory 102 in FIG. 3).

The computer program executed by a computer may be recorded for provision, for example, in a magnetic disk (for example, flexible disk, hard disk), an optical disk (for example, CD-ROM, CD-R, CD-RW, DVD-ROM, DVD±R, DVD±RW, Blu-ray (registered trademark) Disc), a semiconductor memory, or any similar recording medium. The recording medium for storing the computer program may be any computer-readable recording medium in any storage format. The computer program may be configured to be installed in a computer in advance, or the computer program distributed over a network may be installed as appropriate in a computer.

The units included in the motion analysis apparatuses 100, 200, 300 in the foregoing embodiments may be implemented by a computer program (software) or may be entirely or partially implemented by dedicated hardware such as an application specific integrated circuit (ASIC) or a field-programmable gate array (FPGA).

The motion analysis apparatuses 100, 200, 300 in the foregoing embodiments may be configured as a network system including a plurality of computers connected to communicate with each other, and the above-noted units may be implemented so as to be distributed over the computers.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A motion analysis apparatus comprising:

a memory; and processing circuitry configured to:

extract, as a motion segment in which there is presumably a movement, a segment in which a statistical quantity is equal to or greater than a first threshold, the statistical quantity being obtained using an analysis window of a predetermined time length for a waveform of a high frequency band of a first waveform pattern representing first time-series data based on output of a first sensor configured to measure movement of a first object or a second waveform pattern representing second time-series data based on output of a second sensor configured to measure movement of a second object, a segment in which a variation is equal to or greater than a second threshold, the variation being obtained using an analysis window of a predetermined time length for a waveform of a low frequency band of the first waveform or the second waveform, and a segment in which the variation falls below the second threshold and subsequently becomes equal to or greater than the second threshold and that has a segment length equal to or smaller than a third threshold;

detect, by using the extracted motion segment, a corresponding segment being a segment in which the first time-series data based on output of a first sensor configured to measure movement of a first object and second time-series data based on output of a second sensor configured to measure movement of a second object, the corresponding segment being a segment in which the first time-series data and the second time-series data are similar in their waveform patterns or cooccur; and associate information specifying the detected corresponding segment with at least one of information specifying the first object or information specifying the second object.

2. The apparatus according to claim 1, wherein the processing circuitry detects, as the corresponding segment, a segment in which the first waveform pattern representing the first time-series data and the second waveform pattern representing the second time-series data matches, or a segment in which similarity between the first waveform pattern and the second waveform pattern is equal to or greater than a reference value, and the processing circuitry further associates the information specifying the detected corresponding segment with the similarity between the first waveform pattern and the second waveform pattern in the corresponding segment.

3. The apparatus according to claim 1, wherein the first sensor and the second sensor are at least one of an acceleration sensor configured to measure vibration, a gyro sensor configured to measure rotational movement, and a geomagnetic sensor configured to detect geomagnetism.

4. The apparatus according to claim 1, wherein the first object is a person and the second object is an object used by the person.

5. The apparatus according to claim 1, wherein the processing circuitry detects, from the second time-series data, the corresponding segment that is similar to or cooccurs with any one of a plurality of pieces of the first time-series data corresponding to a plurality of first objects, and the processing circuitry associates information specifying the detected corresponding segment with information specifying the first object corresponding to the first time-series data that is similar to or cooccurs with the second time-series data.

6. The apparatus according to claim 1, wherein the processing circuitry is further configured to classify similarity between the first waveform pattern representing the first time-series data and the second waveform pattern representing the second time-series data in the corresponding segment, or a feature calculated from the first time-series data or the second time-series data in the corresponding segment, into a designated number of clusters, and associate the information specifying the detected corresponding segment with a result of classification.

* * * * *